US009454499B2

(12) United States Patent
Neeb et al.

(10) Patent No.: US 9,454,499 B2
(45) Date of Patent: Sep. 27, 2016

(54) ASYNCHRONOUS COMMUNICATION BETWEEN DEVICES

(71) Applicant: INTEL CORPORATION, Santa Clara, CA (US)

(72) Inventors: James Neeb, Gilbert, AZ (US); Bradly L. Inman, Hillsboro, OR (US); Nathan S. Blackwell, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 564 days.

(21) Appl. No.: 13/915,325

(22) Filed: Jun. 11, 2013

(65) Prior Publication Data

US 2014/0365832 A1 Dec. 11, 2014

(51) Int. Cl.
*G06F 13/36* (2006.01)
*G06F 13/16* (2006.01)
*G06F 11/22* (2006.01)
*G06F 13/40* (2006.01)

(52) U.S. Cl.
CPC ......... *G06F 13/1673* (2013.01); *G06F 11/221* (2013.01); *G06F 13/4027* (2013.01)

(58) Field of Classification Search
CPC ................. G01R 31/3177; G01R 31/318547; G01R 31/31908; G01R 31/28
USPC .............. 710/306–317, 8–19, 29–31, 33–35; 714/30, 726, 734
See application file for complete search history.

(56) References Cited

U.S. PATENT DOCUMENTS

| | | | |
|---|---|---|---|
| 6,718,412 B2 * | 4/2004 | Purcell | G06F 13/426 710/109 |
| 6,956,390 B1 | 10/2005 | Feltner et al. | |
| 7,031,868 B2 * | 4/2006 | Yeung | G01R 31/31855 702/120 |
| 7,340,541 B2 * | 3/2008 | Castro | G06F 13/4059 326/93 |
| 8,645,589 B2 * | 2/2014 | Scorsi | G05B 19/4183 710/22 |
| 9,015,542 B2 * | 4/2015 | Jones | G01R 31/318547 714/30 |
| 2003/0001605 A1 | 1/2003 | Jones et al. | |
| 2005/0224492 A1 | 10/2005 | Roy et al. | |
| 2005/0267645 A1 | 12/2005 | Fenk | |
| 2006/0143334 A1 * | 6/2006 | Naik | H04L 49/3045 710/56 |
| 2007/0150631 A1 * | 6/2007 | Druke | A61B 19/2203 710/244 |
| 2007/0267188 A1 | 11/2007 | Stefano et al. | |
| 2009/0100201 A1 * | 4/2009 | Moch | H04L 1/24 710/34 |
| 2011/0072307 A1 * | 3/2011 | Hatley | H04L 12/2697 714/32 |
| 2014/0062513 A1 | 3/2014 | Johnson et al. | |

* cited by examiner

*Primary Examiner* — Raymond Phan
(74) *Attorney, Agent, or Firm* — Schwabe, Williamson & Wyatt, P.C.

(57) ABSTRACT

Techniques and configurations are disclosed herein for communication between devices. In some embodiments, a bus for communication between first and second devices may include a transmit buffer and one or more processing devices. The one or more processing devices may be configured to receive first asynchronous data from an operating system, running on a central processing unit of the first device, on an operating system signal path; transmit the first asynchronous data from the first device to the second device on a command signal path; transmit first data from the transmit buffer to the second device at a first fixed packet frequency on a transmit signal path; and receive data from the second device at a second fixed packet frequency on a receive signal path different from the transmit signal path. Other embodiments may be disclosed and/or claimed.

22 Claims, 4 Drawing Sheets

ASYNCHRONOUS COMMUNICATION BETWEEN DEVICES

FIELD

Embodiments of the present disclosure generally relate to the field of electronic devices, and more particularly, to communication between devices.

BACKGROUND

A number of industry standard buses, such as General Purpose Interface Bus (GPIB), Universal Serial Bus (USB), are commonly used for communication between two or more devices (e.g., computing devices). Because such buses utilize complex communication protocols, configuring devices to use such protocols may be expensive and time-consuming. Other industry standard buses, such as I2C, may utilize simpler protocols, but are not rich enough to be used in applications that require more than a basic command set. Proprietary buses, designed to enable communication of specific information between specific devices, are typically not flexible enough to serve other purposes.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe device communication techniques and configurations. In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other.

Figure 1:
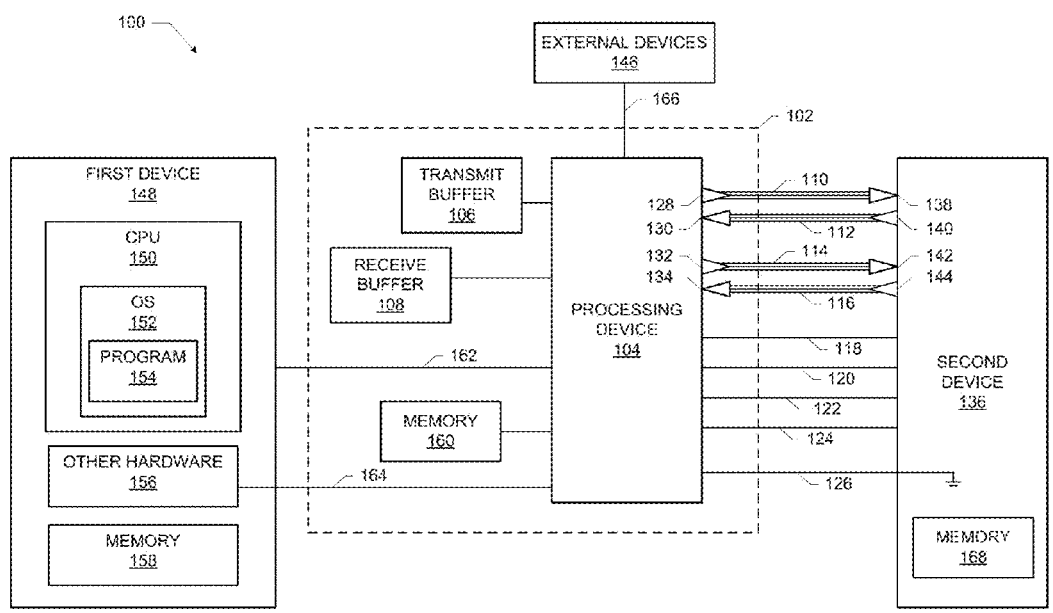
FIG. 1 schematically illustrates a system including a multipurpose bus configured to enable communication between first and second devices, in accordance with some embodiments.

FIG. 1 schematically illustrates a system 100 including a multipurpose bus 102 configured to enable communication between a first device 148 and a second device 136, in accordance with some embodiments. The first device 148 and the second device 136 may be any types of electronic devices including computing devices, test equipment, device handlers, sensors (e.g., for measuring pressure, temperature, voltage, acceleration, etc.), audio or video recording devices, for example. The first device 148 and the second device 136 may not be a same type of device; for example, the first device 148 may be a computing device (e.g., a server or personal computer) and the second device may be a device handler or a sensor. In some embodiments, the first device 148 may serve as the "master" device and the second device 136 may serve as the "slave" device for communication via the multipurpose bus 102. In some embodiments, the first device 148 may always act as the "master" device with respect to one or more slave devices configured as described herein with reference to the second device 136. In some embodiments, the multipurpose bus 102 may be physically housed within or otherwise included as a component of the first device 148.

As shown in FIG. 1, the first device 148 may include a central processing unit (CPU) 150. The CPU 150 may be configured to execute a set of machine-readable instructions stored in a memory 158 (or other storage device) that, when executed by the CPU 150, cause the first device 148 to perform communication and other operations as described herein. For example, the first device may run an operating system (OS) 152. The OS 152 may be a publicly available OS, such as WINDOWS, UNIX, or LINUX, or may be a proprietary OS. In some embodiments, the OS 152 may be a tester OS that controls operations of one or more devices in communication with the first device 148 (e.g., the second device 136, as discussed below).

The CPU 150 may further be configured to execute a set of machine-readable instructions stored in the memory 158 (or other storage device) that, when executed by the CPU 150, cause the first device 148 to run, on the OS 152, a program 154. In some embodiments, the program 154 may be a program for processing data from and/or controlling the second device 136. For example, the program 154 may be configured to receive data from the second device 136 via the multipurpose bus 102, analyze or otherwise process that data, and provide commands to the second device 136 via the multipurpose bus 102. In some embodiments, the program 154 may be a test program that contains a specific test routine for a device-under-test (DUT) that may serve as the second device 136 or that may be in communication with the second device 136. In some embodiments, the commands provided to the second device 136 may be based at least in part on the data received from the second device 136, forming a control loop.

The first device 148 may also include other hardware 156, which may include additional processing devices other than the CPU 150 (e.g., one or more digital signal processors (DSPs), application specific integrated circuits (ASICs)) or any other hardware (e.g., storage devices, displays, user input devices, etc.). In some embodiments, the other hardware 156 may include a network adapter configured to allow the first device 148 to communicate with one or more remote devices via a wired or wireless communication protocol. The one or more remote devices may perform any number of tasks, including processing data received from the second device 136 via the multipurpose bus 102, for example. In some embodiments, the one or more remote devices may include cloud computing resources.

The first device 148 may communicate with the multipurpose bus 102 via the OS 152 on an OS signal path 162. In some embodiments, the OS signal path 162 includes a USB interface (and corresponding software driver) for communication between the multipurpose bus 102 and the CPU 150. In some embodiments, a Peripheral Component Interconnect (PCI) Express interface may be included in the OS signal path 106. Other communication protocols and hardware may also be used. In some embodiments, the first device 148 may provide asynchronous data to the multipurpose bus 102 on the OS signal path 162. The asynchronous data may include, for example, commands for the operation of the second device 136 or requests for information from the second device 136 (e.g., requests for status information). In some embodiments, the multipurpose bus 102 may provide data, received from the second device 136, to the first device 148 via the OS signal path 162. In some embodiments, the multipurpose bus 102 may provide data, received from the second device 136, to the other hardware 156 of the first device 148 via the OS signal path 162, or via a signal path 164 that does not route through the OS 152. As used herein, the term "signal path" may include one or more electrical signaling pathways (e.g., one or more wires) which may enable communication using any of a number of signaling protocols involving some or all of the pathways. For example, a single signal path may include a plurality of wires, each transmitting electrical signals.

The multipurpose bus 102 may include a processing device 104 (which may be one or more processing devices, such as one or more microcontrollers), which may be configured to execute machine-readable instructions (stored, e.g., in a memory 160) that, when executed by the processing device 104, cause the multipurpose bus 102 to perform communication and other operations as described herein. The processing device 104 may be in communication with the first device 148 via the OS signal path 162 and/or the signal path 164. In some embodiments, the processing device 104 may execute bus operations independently of the operation of the CPU 150, maintaining performance independent of the operation of the OS 152 and/or the program 154. As discussed in additional detail below, in some embodiments, the processing device 104 may be included in the first device 148, and/or controlled by the first device 148 (e.g., via the OS signal path 162 or by the signal paths 110-112 instead of or in addition to the OS signal path 162).

The processing device 104 may also be in communication with a transmit buffer 106 and a receive buffer 108. The transmit buffer 106 may be a memory configured to store data to be transmitted to the second device 136 by the multipurpose bus 102. The receive buffer 108 may be a memory configured to store data received from the second device 136 by the multipurpose bus 102. In some embodiments, the transmit buffer 106 and/or the receive buffer 108 may be flushed upon receipt of each new packet of data or fixed number of packets of data. Additional embodiments of the transmit buffer 106 and the receive buffer 108 are discussed below.

In some embodiments, one or more external devices 146 (e.g., remote or local computing devices or test equipment) may be coupled with the multipurpose bus 102 via an external device signal path 166. In some embodiments, the one or more external devices 146 may be coupled with the receive buffer 108 and/or the transmit buffer 106 (e.g., directly or via the processing device 104) to provide or access data for transmission to the second device 136 and/or to receive or access data received from the second device 136, accordingly. For example, the transmit buffer 106 may be populated with data by one or more of the external devices 146, the processing device 104, and/or the first device 148.

The multipurpose bus 102 may communicate with the second device 136 along a number of signal paths, which may be configured to enable such communication. In some embodiments, one or more of the ports included in the multipurpose bus 102 and/or the second device 136 may include one or more transceivers included in signal paths associated with the multipurpose bus 102, the second device 136 or any other device described herein. Each transceiver may include, for example, at least one transmit port and at least one receive port. In some embodiments, one or more of such transceivers may be RS-422 transceivers in accordance with an American National Standards Institute (ANSI) standard. In some embodiments, a transceiver may provide a speed of 30 megabits per second or greater over a cable of 20 feet of length or greater. In some embodiments, a port may be configured for both reception and transmission. As shown in FIG. 1, an isolated ground reference 126 may be provided, which may prevent the formation of ground loops between the first device 148 and the second device 136.

In some embodiments, a first command signal path 110 may extend between a first port 128 of the processing device 104 and a first port 138 of the second device 136. The first command signal path 110 may be configured for the transmission of asynchronous data from the first device 148 to the second device 136 (via the multipurpose bus 102). For example, in some embodiments, the processing device 104 may receive asynchronous data from the OS 152 of the first device 148 via the OS signal path 162 and transmit that asynchronous data to the second device 136 via the first command signal path 110. As discussed above, the asynchronous data may include, for example, commands for the operation of the second device 136 or requests for information from the second device 136 (e.g., requests for status information). In some embodiments, the processing device 104 of the multipurpose bus 102 may not analyze, repackage, or otherwise significantly process the asynchronous data received from the OS 152 via the first command signal path 110 before transmitting the asynchronous data to the second device 136; the multipurpose bus 102 may simply "pass through" the asynchronous data. In some embodiments, data transmitted via the first command signal path 110 may be formed as packets, which may include headers having error checking features (e.g., as discussed below with reference to FIG. 5).

In some embodiments, a second command signal path 112 may extend between a second port 130 of the processing device 104 and a second port 140 of the second device 136. The second command signal path 112 may be configured for the transmission of asynchronous data from the second device 136 to the first device 148 (via the multipurpose bus 102). For example, in some embodiments, the processing device 104 may receive asynchronous data from the second device 136 via the second command signal path 112 and may transmit that data to the OS 152 of the first device 148 via the OS signal path 162. As discussed above, the asynchronous data may include, for example, responses to commands for the operation of the second device 136 or requests for information from the second device 136. For example, the second device 136 may transmit status information or command acknowledgment information to the multipurpose bus 102 over the second command signal path 112.

Any of a number of commands, requests and responses may be transmitted over the first command signal path 110 and the second command signal path 112. In various embodiments, commands or requests may be transmitted over the first command signal path 110 and/or the second command signal path 112, and responses may be transmitted over the first command signal path 110 and/or the second command signal path 112. For example, a loopback request may be transmitted, in response to which a loopback reply may be transmitted. An identifier request may be transmitted, in response to which an identifier may be transmitted (e.g., a Globally Unique Identifier (GUID) or other fixed-length identifier). A software version request may be transmitted, in response to which information about the current software version may be transmitted. A bulk read command may be transmitted, in response to which a block or other portion of data may be transmitted (located, e.g., in various memory locations in any suitable memory). A bulk write command may be transmitted, in response to which a "bulk write complete" message may be transmitted after write operations are complete. Streaming values information may be transmitted, indicating how many values the transmitting device has been configured to send on another signal path (e.g., the transmit signal path 114 or the receive signal path 116, discussed below); in some embodiments, in response to receiving streaming values information from one device, the receiving device may transmit streaming values information indicating how many values the receiving device has been configured to send on a designated signal path (e.g., the transmit signal path 114 or the receive signal path 116). A start streaming command may be transmitted to trigger the transmission of data over another signal path (e.g., the transmit signal path 114 or the receive signal path 116), in response to which a "streaming started" message may be transmitted. In some embodiments, a device that sends a start streaming command, upon receiving a "streaming started" message, may itself start streaming (e.g., within a predetermined timeout period). A stop streaming command may be transmitted to stop the transmission of data over another signal path (e.g., the transmit signal path 114 or the receive signal path 116), in response to which a "streaming stopped" message may be transmitted. In some embodiments, a device that sends a stop streaming command, upon receiving a "streaming stopped" message, may itself stop streaming (e.g., within a predetermined timeout period). A "soft reset" command may be transmitted to trigger a software reset on the receiving device. A "get status" request may be transmitted, in response to which requested status information may be provided by the receiving device. A "get time" command may be transmitted, in response to which the current local time at the receiving device may be provided.

The second command signal path 112 may be different from the first command signal path 110. In some embodiments, data may be transmitted over the second command signal path 112 in parallel with or independently of the transmission of data over the first command signal path 110. In some embodiments, the processing device 104 of the multipurpose bus 102 may not analyze, repackage, or otherwise significantly process the asynchronous data received from the second device 136 via the second command signal path 112 before transmitting the asynchronous data to the first device 148; the multipurpose bus 102 may simply "pass through" the asynchronous data. In some embodiments, data transmitted via the second command signal path 112 may be formed as packets, which may include headers having error checking features (e.g., as discussed below with reference to FIG. 5).

In some embodiments, a transmit signal path 114 may extend between a third port 132 of the processing device 104 and a third port 142 of the second device 136. The transmit signal path 114 may be configured for the transmission of data at a predetermined packet transmit frequency from the first device 148 to the second device 136 (via the multipurpose bus 102). The second device 136 may be configured to receive the data transmitted from the multipurpose bus 102 over the transmit signal path 114. The data transmitted over the transmit signal path 114 may be taken from the transmit buffer 106 by the processing device 104. The storage of data in the transmit buffer 106 may be temporary (e.g., with a fixed lifetime) or may be shifted out as new data for transmission is received at the multipurpose bus 102. In some embodiments, the transmit buffer 106 may be populated with data from the OS 152 running on CPU 150 of the first device 148. In some embodiments, the transmit buffer 106 may be populated with data from the other hardware 156 of the first device 148 on the signal path 164 and/or from one or more of the external devices 146 on the external device signal path 166. The transmit signal path 114 may be different from either of the signal paths 110-112. In some embodiments, data may be transmitted over the transmit signal path 114 in parallel with or independently of the transmission of data over either of the signal paths 110-112.

In some embodiments, a receive signal path 116 may extend between a fourth port 134 of the processing device 104 and a fourth port 144 of the second device 136. The receive signal path 116 may be configured for the reception of data at a predetermined packet receive frequency at the first device 148 from the second device 136 (via the multipurpose bus 102). In some embodiments, the packet transmit frequency may be a same frequency as the packet receive frequency. In some embodiments, the packet transmit frequency may be a different frequency as the packet receive frequency. For example, the packet transmit frequency may be a multiple or a fraction of the packet receive frequency.

The second device 136 may be configured to transmit the data received at the multipurpose bus 102 over the receive signal path 116. The data received via the receive signal path 116 may be stored in the receive buffer 108 by the processing device 104. The storage of data in the receive buffer 108 may be temporary (e.g., with a fixed lifetime) or may be shifted out as new data is received at the multipurpose bus 102. In some embodiments, the multipurpose bus 102 may transmit received data (e.g., stored in the receive buffer 108) to the OS 152 of the first device 148 on the OS signal path 162. In some embodiments, the multipurpose bus 102 may transmit received data (e.g., stored in the receive buffer 108) to the other hardware 156 of the first device 148 on the signal path 164, and/or to one or more of the external devices 146 on the external device signal path 166. The receive signal path 116 may be different from any of the signal paths 110-114. In some embodiments, data may be transmitted over the receive signal path 116 in parallel with or independently of the transmission of data over any of the signal paths 110-114.

As discussed above, the second device 136 may be any type of electronic device including a computing device, test equipment, or a sensor, for example. In some embodiments, the second device 136 may be a device handler used during testing in a manufacturing or other setting for placing one or more DUTs in electrical contact with the first device 148 and/or any of the external devices 146. For example, the second device 136 may be a device handler used for putting one or more integrated circuit (IC) dies in electrical contact with a control computer serving as the first device 148. Some device handlers may be configured to place a DUT in a socket to provide the electrical contact between the DUT and the control computer serving as the first device 148. The second device 136 may include a number of instruments that may be used to stimulate and test a DUT (e.g., one or more power supplies and digital controls). In some embodiments, instruments used to test a DUT may be separate from the second device 136.

Figure 2:
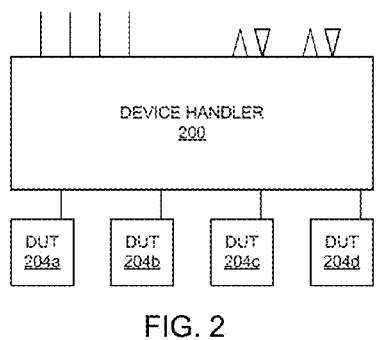
FIG. 2 schematically illustrates a device handler which may act as the second device of FIG. 1, in accordance with some embodiments.

FIG. 2 schematically illustrates a device handler 200 which may act as the second device 136 of FIG. 1 and which may be configured for placing DUTs 204a, 204b, 204c and 204d in electrical contact with the first device 148. Although four DUTs are illustrated in FIG. 2, the device handler 200 may handle fewer or more DUTs.

Figure 3:
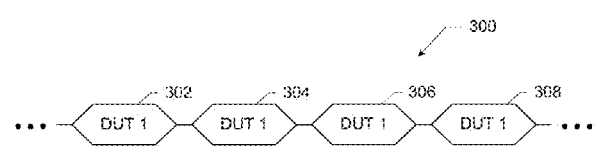
FIGS. 3 and 4 schematically illustrate data packet streams that may be transmitted between the second device and the multipurpose bus of FIG. 1, in accordance with some embodiments.
Figure 4:
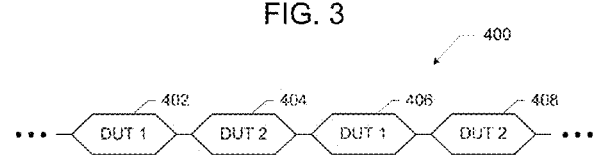

In some embodiments, the data transmitted from the device handler 200 to the first device 148 over the receive signal path 116 may include interleaved packets from each of the plurality of DUTs 204a, 204b, 204c and 204d. FIGS. 3 and 4 schematically illustrate data packet streams that may be transmitted between the second device 136 (which may be, for example, the device handler 200) and the multipurpose bus 102 via the receive signal path 116. In particular, FIG. 3 illustrates an embodiment of a data stream 300 in which the second device 136 provides packets of data containing information about a single DUT (DUT 1); in this embodiment, each of the packets 302, 304, 306 and 308 includes information about DUT 1. FIG. 4 illustrates an embodiment of a data stream 400 in which the second device 136 provides packets of data containing information about two different DUTs (DUTs 1 and 2); in this embodiment, the packets transmitted over the signal path 116 may alternate between packets of information about DUT 1 (e.g., the packets 402 and 406) and packets of information about DUT 2 (e.g., the packets 404 and 408).

Although FIG. 4 illustrates a data stream including information about only two DUTs, information about more than two DUTs may be transmitted using interleaved packets in an analogous matter. In some embodiments, information about N DUTs may be transmitted such that information about any particular DUT is included in every Nth packet. In some embodiments, more packets may be allocated to one DUT than another; for example, a data stream may include a repeating pattern of two packets devoted to a first DUT followed by a single packet devoted to a second DUT. Interleaved packets may also be used to transmit different types of information about a single DUT; for example, packets including information about a clock speed of a DUT may alternate with packets including information about a power consumption of the DUT (e.g., when the DUT may be adjusting its clock speed and power consumption during test). In another example, packets including information about a thermal read resistance temperature detector reading of a DUT may alternate with packets including information about a socket pressure reading of the DUT.

Returning to FIG. 1, in some embodiments, the transmit buffer 106 may include multiple buffers (e.g., different portions of a single memory device or different memory devices), each of which may be used to store a different type of data to be transmitted to the second device 136. For example, in some embodiments, the second device 136 may monitor and/or control one or more other devices (e.g., DUTs in a test fixture), and data relevant to each of the different one or more devices may be stored in the corresponding one or more transmit buffers. In some embodiments, the second device 136 may receive one or more types of information about the second device 136 itself or a single other device (e.g., a single DUT), and data representative of each of the different one or more types of information may be stored in the corresponding one or more transmit buffers. In some embodiments, each of one or more transmit buffers will store data received from a different one of the external devices 146 for transmission to the second device 136.

In some embodiments, the receive buffer 108 may include multiple buffers (e.g., different portions of a single memory device or different memory devices), each of which may be used to store a different type of data received from the second device 136. For example, in some embodiments, the second device 136 may monitor one or more other devices (e.g., DUTs in a test fixture), and data representative of each of the different one or more devices may be stored in the corresponding one or more receive buffers. In some embodiments, the second device 136 may monitor one or more types of information about the second device 136 itself or a single other device (e.g., a single DUT), and data representative of each of the different one or more types of information may be stored in the corresponding one or more receive buffers.

A device handler may be further configured to control environmental or other properties of the one or more DUTs to maintain adequate testing conditions. In some embodiments, the device handler may use data received from the first device 148 and/or any of the external devices, via the transmit signal path 114, to maintain adequate testing conditions. For example, the external devices 146 may include temperature and/or pressure sensors, and may transmit data from these sensors, via the transmit buffer 106 and the transmit signal path 114 to the device handler, whereupon the device handler may respond to the data by adjusting an environment of the one or more DUTs (e.g., by activating an active cooling system). As indicated above, in some embodiments, the transmit signal path 114 and the receive signal path 116 may be part of a control loop for operation of the second device 136. For example, the transmit signal path 114 and the receive signal path 116 may be part of a control loop for thermal control of a DUT handled by the device handler (which may allow the first device 148 to perform tests on the DUT under a set of desired thermal specifications). The temperature data may be provided to the second device 136 at a uniform frequency (corresponding to the packet frequency along the transmit signal path 114), and used by the second device 136 for nearly continuous thermal control. In another example, the transmit signal path 114 and the receive signal path 116 may be part of a control loop for force feedback control of a DUT handled by the device handler. Force data may be provided to the second device 136 at a uniform frequency (corresponding to the packet frequency along the transmit signal path 114), and used by the second device 136 for control of a unit used to apply pressure to the DUT to keep the DUT connected in a test socket. In another example, the transmit signal path 114 and the receive signal path 116 may be part of a control loop for positioning of a DUT handled by the device handler. Position sensor data may be provided to the second device 136 at a uniform frequency (corresponding to the packet frequency along the transmit signal path 114), and used by the second device 136 for control of a mechanical placement device (e.g., a pick-and-place device) that is used to adjust the position of a DUT with respect to a test socket as the DUT is being placed in the test socket.

Figure 5:
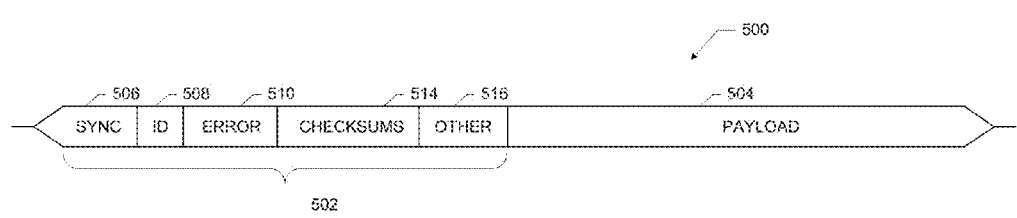
FIG. 5 schematically illustrates a data packet that may be transmitted to the multipurpose bus of FIG. 1, in accordance with some embodiments.

In some embodiments, each packet transmitted along the transmit signal path 114 and/or the receive signal path 116 may be divided into a header portion and a payload portion. Information in a header may include, for example, information about the second device 136 and/or information about the payload data in the same packet. FIG. 5 schematically illustrates a data packet 500 that may be transmitted to the multipurpose bus 102 from the second device 136, in accordance with some embodiments. In some embodiments, the data packet 500 may have a length of 32 bits or another fixed size. The data packet 500 may include a header 502 and a payload 504. The payload 504 may include any of a number of types of information measured, sensed by, or descriptive of the second device 136 or devices related to the second device 136. The payload 504 may include information about one or more aspects of the second device 136 or one or more devices in communication with the second device 136. For example, the payload 504 may include temperature, pressure, speed, power consumption, position or proximity data, optical data (such as infrared emissions) or other information.

In some embodiments, the payload 504 may take one of a predetermined number of values known to the first device 148 and the second device 136. This set of predetermined values may act as a dictionary of possible messages that may be transmitted between the first device 148 and the second device 136, and may be stored in the same or different forms in the memory 158 of the first device 148 and the memory 168 of the second device 136. This dictionary may be initialized in the memory 158 of the first device 148 when, for example, the program 154 or the OS 152 is loaded. In some embodiments, one or more of the values of the payload 504 may be reserved as a bitmask of status bits which may be used to transmit warnings, errors and other information.

In some embodiments, the header 502 may include a sync data field 506. The sync data field 506 may include a predetermined sync value (e.g., a pattern of bits) that indicates the start of a new packet. When an error occurs (e.g., when a checksum mismatches, as discussed below), the first device 148 and/or the multipurpose bus 102 may wait until the next sync value of the sync data field 506 is detected, and resynchronize communications accordingly.

In some embodiments, the header 502 may include an identification field 508. In embodiments in which the receive buffer 108 includes a plurality of receive buffers, the value of the identification field 508 may indicate into which of the plurality of receive buffers the data packet 500 should be directed and stored. As discussed above, in some embodiments, different receive buffers may correspond to different DUTs managed by the second device 136.

In some embodiments, the header 502 may include an error field 510. The value of the error field 510 may indicate whether the second device 136 is experiencing an error condition. In some embodiments, the value of the error field 510 may indicate which of a plurality of error conditions are being experienced by the second device 136. In some embodiments, in response to detecting a value of the error field 510 that indicates an error condition, the multipurpose bus 102 may transmit a status request to the second device 136, via the first command signal path 110. The status request may, for example, query one or more status registers included in the memory 168 and representative of operational characteristics of the second device 136 (e.g., status registers indicating whether the second device 136 is over or under safe temperature points; status registers that maintain counts of various communication errors, such as checksum errors or non-received packets; and status registers that indicate that one or more sensors or other devices are in an error state).

In some embodiments, the header 502 may include a checksums field 514. The checksums field 514 may include a checksum (e.g., a sum of bytes) that can be used to test the integrity of the data included in the header 502, and/or a checksum that can be used to test the integrity of the data included in the payload 504. In some embodiments, when one or more checksums included in the checksums field 514 indicates a mismatch, the packet may be reissued (e.g., in response to a retransmit request issued to the second device 136 by the multipurpose bus 102 and/or the first device 148). In some embodiments, errors in packets transmitted over the transmit signal path 114 and/or the receive signal path 116 may be ignored and not resent by the sender. In some embodiments, errors in packets transmitted over the first command signal path 110 and/or the second command signal path 112 may trigger an auto-retry procedure, initiated by the sender, in which the packets are resent until an expected response message is received or a predetermined number of consecutive transmission failures have occurred. In some embodiments, upon occurrence of the predetermined number of consecutive transmission failures, the sending or receiving device may go into a "safe state" in which user intervention is required to restart communication.

In some embodiments, the header 502 may include one or more additional fields 516 instead of or in addition to the fields described above. Examples of additional fields 516 may include a timestamp field (which may be used to synchronize timing systems between the first device 148 and the second device 136), an incrementing packet number field (so that the first device 148 and/or the second device 136 may monitor and detect whether packets are dropped unexpectedly by a break in a sequence), and/or a header configuration field that may specify the number and/or size of fields in the header to accommodate a dynamically-sized header (which may support a variably sized incrementing packet number field, a variably-sized sync data field 506, and/or different checksum methods, for example).

The multipurpose bus 102 may provide a number of other signal paths between the first device 148 and the second device 136. In some embodiments, the multipurpose bus 102 may provide a first device present signal path 118 between the first device 148 and the second device 136. The multipurpose bus 102 may transmit an indicator on the first device present signal path to indicate whether or not the first device 148 is available for communication. In some embodiments, the indicator may be a binary signal (e.g., a logic "1" for available, and a logic "0" for unavailable). The first device 148 may not be available for communication when, for example, the first device 148 is busy with other tasks, is turned off, is in a sleep or low power state, or is in a fault state, for example. The multipurpose bus 102 may receive information about the availability of the first device 148 from one or more registers or other memory locations of the first device 148 via the OS signal path 162 or the signal path 164. The first device present signal path 118 may be different from any of the signal paths 110-116. In some embodiments, data may be transmitted over the first device present signal path 118 in parallel with or independently of the transmission of data over any of the signal paths 110-116.

In some embodiments, the multipurpose bus 102 may provide a second device present signal path 120 between the first device 148 and the second device 136. The multipurpose bus 102 may transmit an indicator on the second device present signal path 120 to indicate whether or not the second device 136 is available for communication. In some embodiments, the indicator may be a binary signal (e.g., a logic "1" for available, and a logic "0" for unavailable). As discussed above with reference to the first device 148, the second device 136 may not be available for communication when, for example, the second device 136 is busy with other tasks, is turned off, is in a sleep or low power state, or is in a fault state, for example. The first device 148 may use the information communicated via the second device present signal path 120 to know when, for example, to query the second device 136 for identification information at the outset of communication, or to disable the second command signal path 112 and/or the receive signal path 116 (e.g., when the second device 136 is not available). In some embodiments, the second device 136 may control the value of the indicator transmitted over the second device present signal path 120. The second device present signal path 120 may be different from any of the signal paths 110-118. In some embodiments, data may be transmitted over the second device present signal path 120 in parallel with or independently of the transmission of data over any of the signal paths 110-118.

In some embodiments, the multipurpose bus 102 may be configured to respond to the indicator transmitted over the first device present signal path 118 and/or the indicator transmitted over second device present signal path 120 by adjusting one or more operations of the multipurpose bus 102. For example, the multipurpose bus 102 may disable one or more signal paths in response to an indicator that the first device 148 is not available for communication and/or the second device 136 is not available for communication. In some embodiments, the multipurpose bus 102 may disable one or more of the first command signal path 110, the second command signal path 112, the transmit signal path 114 and the receive signal path 116. As used herein, "disabling" a signal path may refer to disabling one or more ports, transceivers or other hardware associated with the signal path. For example, disabling the first command signal path 110 may be implemented by disabling the first port 128.

In some embodiments, the multipurpose bus 102 may provide a reset signal path 122 between the first device 148 and the second device 136. The multipurpose bus 102 may transmit a reset signal on the reset signal path 122, in response to which the second device 136 may reset one or more of its components. As used herein, a "reset" may include powering down a component and then powering the component back up, clearing a memory, reinitializing default settings for one or more components, or any combination of reset behaviors. In some embodiments, the reset signal may be a binary signal (e.g., a logic "1" to instruct a reset, and a logic "0" when no reset is needed). In some embodiments, the reset signal may take more than two values, and thus may communicate information about a type of reset operation to be performed.

In some embodiments, the first device 148 may transmit the reset signal to the second device 136 (via the multipurpose bus 102 and the reset signal path 122) at regular intervals, when the second device 136 becomes unresponsive, when data received from the second device 136 via the receive signal path 116 is unexpected or invalid, or when data received from the second device 136 via the second command signal path 112 is unexpected, invalid, or representative of an error, for example. The multipurpose bus 102 may receive an instruction or other signal to trigger the transmission of a reset signal to the second device 136 from the first device 148 via the OS signal path 162 or the signal path 164. The reset signal path 122 may be different from any of the signal paths 110-120. In some embodiments, data may be transmitted over the reset signal path 122 in parallel with or independently of the transmission of data over any of the signal paths 110-120.

In some embodiments, the multipurpose bus 102 may provide a fault signal path 124 between the first device 148 and the second device 136. The multipurpose bus 102 may receive fault information from the second device 136, via the fault signal path 124, when the second device 136 detects a fault or other error in its operation. The second device 136 may include logic to determine when one or more of its components is in a fault condition, and to transmit an indicator of such a condition via the fault signal path 124. Examples of fault conditions may include reaching or exceeding a thermal or power safety limit on a DUT (in response to which power to all DUTs may be removed for safety), the failure of a power supply rail on the second device 136 to energize properly, an alarm from a health indicator indicating that successful communication between the first device 148 and the second device 136 is uncertain, the failure of a firmware upgrade on the second device 136 (which may, e.g., impede or prevent communication with the first device 148), among others. In some embodiments, a fault condition may occur when the transmit signal path 114 and/or the receive signal path 116 is not fast enough (or available) to communicate the cause of an operational fault of interest.

In some embodiments, the fault information may be a bitmask or binary value (e.g., a logic "1" to indicate a fault, and a logic "0" to indicate no fault). In some embodiments, the fault information may take more than two values, and thus may communicate information about a type or severity of fault. The first device 148 may use the information communicated via the fault signal path 124 to notify one or more other systems (e.g., one or more other slave devices configured similarly to the second device 136) to shut down.

The fault signal path 124 may be different from any of the signal paths 110-122. In some embodiments, data may be transmitted over the fault signal path 124 in parallel with or independently of the transmission of data over any of the signal paths 110-122.

Various embodiments of the multipurpose buses and communication techniques disclosed herein may provide advantages over existing bus and communication technologies. Existing technologies, such as GPIB and USB, are not readily adaptable for certain applications, such as manufacturing test environments. In such environments, a control computer (e.g., the first device 148) may preferably interface to many different kinds of test equipment, which may have different communication requirements (e.g., asynchronous commands and/or independent isochronous data streaming). Such environments may also require more robustness to noise than existing technologies can provide, and are best-suited by a technology with low design overhead cost (particularly on the slave side).

In some embodiments, the multipurpose buses disclosed herein may provide full duplex communication between first and second devices (e.g., using the transmit signal path 114 and the receive signal path 116). Using off-the-shelf transceivers, such as RS-422 transceivers, to implement one or both of these signal paths allow different slave devices (e.g., the second device 136) to be quickly configured for rapid integration into a larger system. Providing separate signal paths for command information (e.g., the first command signal path 110 and the second command signal path 112) and other status information (e.g., the signal paths 118-124) may allow command and status information to be transmitted in parallel with data transmitted over the transmit signal path 114 and receive signal path 116, without requiring complex encoding or timing protocols, or interrupting the flow of data on the signal paths 114 and 116 to communicate command and/or status information.

In some embodiments, the flow of data on the signal paths 110 and 112 may be independent from the flow of data on the signal paths 114 and 116, which may provide flexibility and speed in development and operation and ensure that a heavy data stream flow on the signal paths 114 and 116 do not delay commands and responses transmitted over the signal paths 110 and 112. In particular, some embodiments may include flexible, bidirectional command paths (e.g., the signal paths 110-112) and flexible, full duplex, bi-directional isochronous data stream paths (e.g., the signal paths 114-116). In embodiments in which the multipurpose bus 102 "passes through" data transmitted over the first command signal path 110 and the second command signal path 112, the processing device 104 of the multipurpose bus 102 need not understand the content or syntax of this data, allowing updates and improvements to be made to the protocols implemented on the side of the first device 148 and the second device 136 without requiring upgrades or changes to the programming of the multipurpose bus 102. When the transmit signal path 114 and the receive signal path 116 are used to provide data packets at a regular frequency, the data provided may be used in time- or cadence-sensitive applications, such as in control loops. Existing bus technologies, such as USB, do not provide data at a regular frequency (without interruption) and thus are not suitable for such applications. Further, in embodiments in which the operation of the processing device 104 are partitioned from the operations of the CPU 150 (e.g., when the processing device 104 is a different device than the CPU 150), execution of bus operations using the processing device 104 may be insulated from glitches in the execution of the program 154 on the CPU 150.

Some embodiments of the multipurpose buses and techniques disclosed herein may also provide advantageous robustness to noise by incorporating error checking features into data packets transmitted via the transmit signal path 114 and/or the receive signal path 116 (e.g., using the error field 510 of the header 502 of the data packet 500 of FIG. 5), and/or into other signal paths such as the fault signal path 124. By adding error detection capabilities to the data packets regularly transmitted over the transmit signal path 114 and/or the receive signal path 116, no policing or interrupt function may need to be added to the communication operations over the multipurpose bus 102, thus simplifying operations and ensuring regular data delivery. RS-422 transceivers, when used as any one or more of the ports 128-134 and/or 138-144, may provide a good signal-to-noise ratio for testing applications. In some embodiments, the processing device 104 included in the multipurpose bus 102 may be a relatively slow or inexpensive microcontroller or field programmable gate array (FPGA), for example, which may minimize cost and expedite implementation. For example, the processing device 104 may include a microcontroller having a serial port device limited to data rates of approximately 230 kilobits per second; the packet frequency and packet size may be adjustable to suit the implementation while maintaining this data rate constraint.

Figure 6:
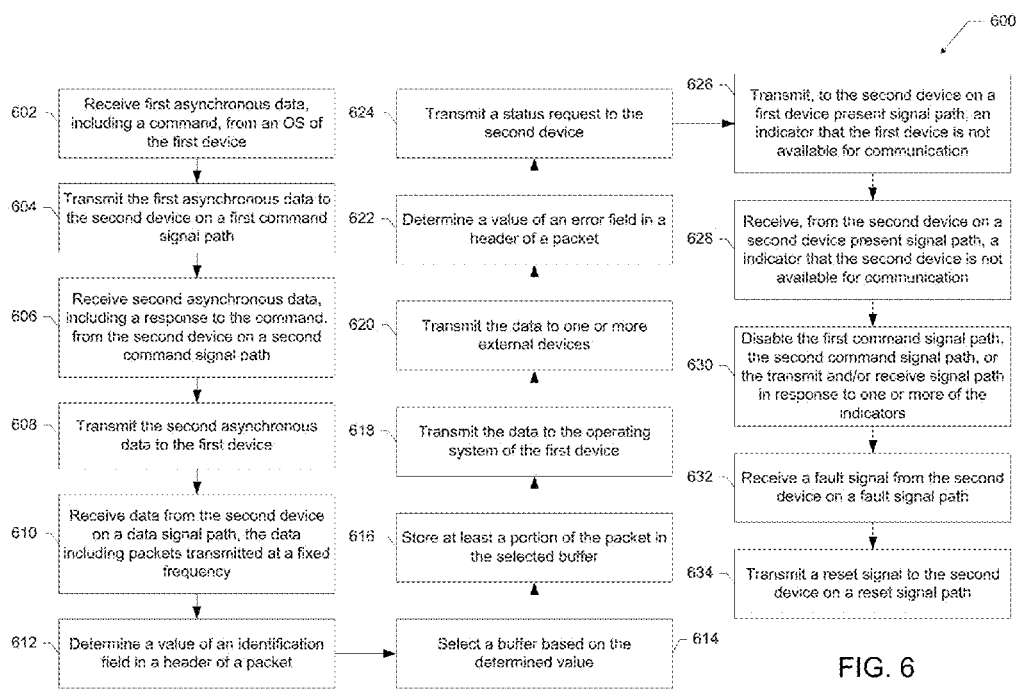
FIG. 6 is a flow diagram of a method of communicating between first and second devices, in accordance with some embodiments.

FIG. 6 is a flow diagram 600 of a method of communicating between first and second devices, in accordance with some embodiments. For illustrative purposes, the operations of the flow diagram 600 will be described as executed by the multipurpose bus 102 to facilitate communication between the first device 148 and the second device 136, but any suitable device may perform any one or more of the operations of the flow diagram 600. The method of the flow diagram 600 may comport with actions described in connection with FIGS. 1-5, in some embodiments. Various operations are described as multiple discrete operations in turn solely for illustrative purposes; the order of description should not be construed as to imply that these operations are necessarily order-dependent. In particular, because many of the operations of the flow diagram 600 may occur via separate signal paths, such operations may be performed in parallel or in overlapping time intervals. In various embodiments, any one or more operations of the flow diagram 600 may be omitted, as suitable for a particular application or communication task.

At 602, the multipurpose bus 102 may receive first asynchronous data from OS 152 of the first device 148. In some embodiments, the first asynchronous data may include a command.

At 604, the multipurpose bus 102 may transmit the first asynchronous data to the second device 136 on the first command signal path 110. The multipurpose bus 102 may transmit the first asynchronous data at 604 in response to receiving the first asynchronous data at 602.

At 606, the multipurpose bus 102 may receive second asynchronous data from the second device 136 on the second command signal path 112. The second command signal path 112 may be different from the first command signal path 110. In some embodiments, the second asynchronous data may include a response to the command transmitted to the second device 136 at 604.

At 608, the multipurpose bus 102 may transmit the second asynchronous data (received at 606) to the first device 148. In some embodiments, the second asynchronous data may be transmitted to the first device 148 via the OS signal path 162 and/or via the signal path 164. The multipurpose bus 102 may transmit the second asynchronous data at 608 in response to receiving the second asynchronous data at 606.

At 610, the multipurpose bus 102 may receive data from the second device 136 on a data signal path (e.g., the receive signal path 116). In some embodiments, the data signal path used at 610 may be different from the first command signal path 110 (of 604) and the second command signal path 112 (of 606). The data received at 610 may include packets transmitted at a fixed frequency. As discussed above, packets received at 610 may include information about one or more DUTs or one or more properties of the second device 136, for example. In some embodiments, the data received at 610 may include interleaved packets representing different types of data or different DUTs, for example, as discussed above with reference to FIGS. 2-4. In some embodiments, a data packet may take the form of any of the embodiments described above with reference to FIG. 5.

At 612, the multipurpose bus 102 may determine a value of an identification field (e.g., the identification field 508 of FIG. 5) in a header of a packet of data (e.g., the data packet 500 of FIG. 5) received from the second device 136 at 610. In some embodiments, the identification field may occupy a particular position in the order of information received at the multipurpose bus 102, or may otherwise be identifiable through a predetermined encoding of the data in the packet received at 610.

At 614, the multipurpose bus 102 may select one or more buffers of a plurality of receive buffers included in the receive buffer 108. The multipurpose bus 102 may select the buffer at 614 based on the value of the identification field determined at 612. For example, the multipurpose bus 102 may access a look-up table or other stored information in the memory 168, which may associate various values of the identification field with various receive buffers; the multipurpose bus 102 may match a value of the identification field with one of the receive buffers via the look-up table, and select the matched receive buffer.

At 616, the multipurpose bus may store at least a portion of the packet (received at 610) in the buffer selected at 614. In some embodiments, only a portion of the packet (e.g., only the payload, a portion of the payload, a portion of the header, or a combination of such portions) may be stored at 616.

At 618, the multipurpose bus 102 may transmit the data received at 610 to the first device 148. In some embodiments, the data received at 610 may be transmitted to the OS 152 of the first device 148 via the OS signal path 162. In some embodiments, the data received at 610 may be transmitted to first device 148 via the signal path 164. The multipurpose bus 102 may transmit the data received at 610 in response to receiving the data at 610, and/or in response to storing the data in the receive buffer 108 (e.g., per the operations 612-616). In embodiments in which only a portion of a packet is stored in a receive buffer (as discussed above with reference to 616), the multipurpose bus 102 may transmit the data received at 610 to the first device 148 by transmitting only the stored portion. In embodiments in which only a single receive buffer 108 is included with the multipurpose bus 102, operations 612-161 may not be performed; instead, packets (or portions of packets) received at 610 may be stored in the single receive buffer 108 and transmitted to the first device 148.

At 620, the multipurpose bus 102 may transmit the data received at 610 to the one or more external devices 146. In some embodiments, the data received at 610 may be transmitted to the one or more external devices 146 via the external device signal path 166. As discussed above with reference to 618, the multipurpose bus 102 may transmit the data received at 610 in response to receiving the data at 610, and/or in response to storing the data in the receive buffer 108 (e.g., per the operations 612-616).

At 622, the multipurpose bus 102 may determine a value of an error field (e.g., the identification field 508 of FIG. 5) in a header of a packet of data (e.g., the data packet 500 of FIG. 5) received from the second device 136 at 610. In some embodiments, the error field may occupy a particular position in the order of information received at the multipurpose bus 102, or may otherwise be identifiable through a predetermined encoding of the data in the packet received at 610.

At 624, the multipurpose bus 102 may transmit a status request to the second device 136 on the first command signal path 110. The multipurpose bus 102 may transmit the status request at 614 in response to determining the value of the error field at 622. In particular, the multipurpose bus 102 may transmit the status request at 614 in response to determining that the value of the error field indicates an error condition in the operation of the second device 136 or a device managed by or otherwise associated with the second device 136 (e.g., a DUT handled by the second device 136).

In some embodiments, the multipurpose bus 102 may be configured to transmit one of a plurality of different status requests, each of which requests information about a different aspect of the operation of the second device 136. The status request transmitted at 624 may be based on the particular value of the error field determined at 622. For example, the multipurpose bus 102 may access a look-up table or other stored information in the memory 168, which may associate various values of the error field with various status requests; the multipurpose bus 102 may match the determined value of the error field with one of the status requests via the look-up table, and transmit the corresponding status request at 624. In some embodiments, the second device 136 may transmit status information to the multipurpose bus 102 in response to receiving the status request; the multipurpose bus 102 may analyze the status information and perform one or more additional measures (e.g., transmitting a reset signal on the reset signal path 122).

At 626, the multipurpose bus 102 may transmit, to the second device 136 on the first device present signal path 118, an indicator that the first device 148 is not available for communication. The multipurpose bus 102 may perform 626 in accordance with any of the embodiments described herein with reference to the first device present signal path 118. As discussed above, the first device present signal path 118 used at 626 may be different from the first command signal path 110 used at 604. The multipurpose bus 102 may not perform 626 when the first device 148 is available for communication, and may perform an alternate operation (e.g., transmitting an indicator that the first device 148 is available for communication, via the first device present signal path 118).

At 628, the multipurpose bus 102 may receive, from the second device 136 on the second device present signal path 120, an indicator that the second device 136 is not available for communication. The multipurpose bus 102 may perform 628 in accordance with any of the embodiments described herein with reference to the second device present signal path 120. As discussed above, the second device present signal path 120 used at 628 may be different from the second command signal path 112 used at 606. The multipurpose bus 102 may not perform 628 when the second device 136 is available for communication, and may perform an alternate operation (e.g., transmitting an indicator that the second device 136 is available for communication, via the second device present signal path 120).

At 630, in response to the indicator that the first device 148 is not available for communication (per 626) and/or the indicator that the second device 136 is not available for communication (per 628), the multipurpose bus 102 may disable the first command signal path 110, the second command signal path 112, the transmit signal path 114 and/or the receive signal path 116. Any desired combination of signal paths may be disabled at 630 in response to any combination of indicators that the first device 148 and/or the second device 136 is not available for communication. In some embodiments, in response to an indicator that the first device 148 is not available for communication (per 626), the second device 136 may enter a state in which all outputs are set to a default value. In some embodiments, in response to an indicator that the second device 136 is not available for communication (per 628), the first device 148 may enter a state in which all outputs are set to a default value. The multipurpose bus 102 may notify the first device 148 and/or the second device 136 when the other device is not available. If communication was interrupted unexpectedly, the first device 148 may be configured to send a command to the second device 136 (e.g., a status check command).

At 632, the multipurpose bus 102 may receive fault information from the second device 136 on the fault signal path 124. The multipurpose bus 102 may perform 632 in accordance with any of the embodiments described herein with reference to the fault signal path 124. As discussed above, the fault signal path 124 used at 632 may be different from the second command signal path 112 used at 606. The multipurpose bus 102 may not perform 632 when no fault information is transmitted from the second device 136, or when the fault information indicates no fault has occurred. In some embodiments, the multipurpose bus 102 may transmit the fault information (e.g., a bitmask or Boolean value) to the first device 148 (e.g., via the OS signal path 162) in response to receiving the fault information at 632.

At 634, the multipurpose bus 102 may transmit a reset signal to the second device 136 on the reset signal path 122. The multipurpose bus 102 may perform 634 in accordance with any of the embodiments described herein with reference to the reset signal path 122. As discussed above, the reset signal path 122 used at 634 may be different from the first command signal path 110 used at 604. The multipurpose bus 102 may not perform 634 when no reset is desired. In some embodiments, the multipurpose bus 102 may perform 634 in response to determining that a value of an error field in a header of a packet of data received from the second device 136 at 610 (e.g., the data packet 500 of FIG. 5), indicates an error condition. The multipurpose bus 102 may perform 632 in addition to or instead of transmitting the status request at 624. In some embodiments, the multipurpose bus 102 may perform 634 in response to receiving fault information from the second device 136 at 632. In some embodiments, the multipurpose bus 102 may perform 634 in response to a reset command transmitted from the first device 148 (e.g., via the OS signal path 162).

Embodiments of the present disclosure may be implemented into a system using any suitable hardware and/or software to configure as desired for communication between devices. In particular, any of the embodiments of the multipurpose bus 102 may be integrated into any suitable device, or implemented as a standalone device that is coupled with other devices (e.g., the first device 148 and the second device 136) via wired or wireless connections. As discussed above, in some embodiments, the multipurpose bus 102 is included with the first device 148, and thus the first device 148 may perform any of the operations of the multipurpose bus 102.

Figure 7:
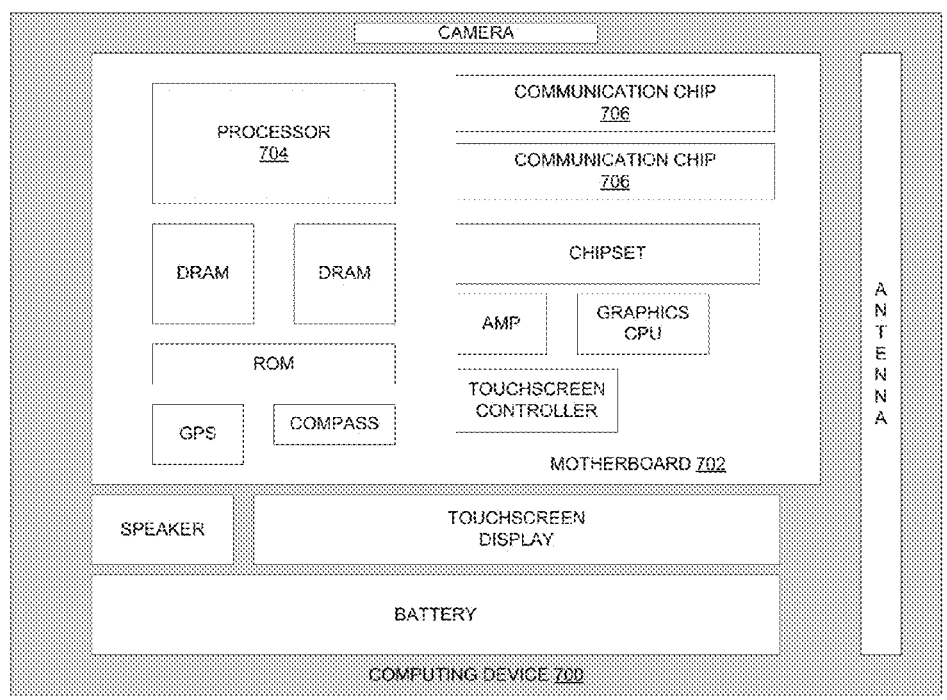
FIG. 7 schematically illustrates a computing device which may include the multipurpose bus of FIG. 1, in accordance with some embodiments.

In some embodiments, the multipurpose bus 102 may be implemented in a computing device. FIG. 7 schematically illustrates a computing device 700 in accordance with some implementations. The computing device 700 may be, for example, a desktop or laptop computer, a server, or mobile communication device. In some embodiments, the first device 148 and/or the second device 136 may be implemented as the computing device 700.

The computing device 700 may house a board such as the motherboard 702. The motherboard 702 may include a number of components, including but not limited to a processor 704 and at least one communication chip 706. As used herein, the term "processor" or "processing device" may refer to any device or portion of a device that processes electronic data from registers and/or memory to transform that electronic data into other electronic data that may be stored in registers and/or memory.

The processor 704 may be physically and electrically coupled to the motherboard 702. In some embodiments, the processor 704 may serve as the processing device 104 of the multipurpose bus 102. In some embodiments, the processor 704 may include multiple processors that may serve as, for example, the CPU 150 of the first device 148 and the processing device 104 of the multipurpose bus 102. In some implementations, the at least one communication chip 706 may also be physically and electrically coupled to the motherboard 702. In further implementations, the communication chip 706 may be part of the processor 704.

Depending on its applications, the computing device 700 may include other components that may or may not be physically and electrically coupled to the motherboard 702 (for example, any of the embodiments of the other hardware 156 of the first device 148, the memory 158, the memory 160, and/or the memory 168). These other components may include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, a Geiger counter, an accelerometer, a gyroscope, a speaker, a camera, and a mass storage device (such as hard disk drive, compact disc (CD), digital versatile disc (DVD), and so forth).

The communication chip 706 may enable wired and/or wireless communications for the transfer of data to and from the computing device 700. In some embodiments, the communication chip 706 may include one or more transmitters, receivers, or transceivers as discussed above (such as one or more RS-422 transceivers) to implement any one or more of the ports 128-134 and/or the ports 138-144. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. The communication chip 706 may operate in accordance with a GSM, General Packet Radio Service (GPRS), Universal Mobile Telecommunications System (UMTS), High Speed Packet Access (HSPA), Evolved HSPA (E-HSPA), or LTE network. The communication chip 606 may operate in accordance with Enhanced Data for GSM Evolution (EDGE), GSM EDGE Radio Access Network (GERAN), UTRAN, or Evolved UTRAN (E-UTRAN). The communication chip 706 may operate in accordance with CDMA, Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 706 may operate in accordance with other wireless protocols in other embodiments.

The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others. In another example, a first communication chip 706 may be dedicated to wired communications (e.g., using one or more RS-422 transceivers) and a second communication chip 706 may be dedicated to wireless communications.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data. In some embodiments, the multipurpose bus configurations and techniques may be implemented in a high-performance computing device. In some embodiments, the multipurpose bus configurations and techniques described herein may be implemented in handheld computing devices.

The following paragraphs provide a number of examples of embodiments of the present disclosure.

Example 1 is a bus for communication between first and second devices, including a transmit buffer and one or more processing devices. The one or more processing devices are configured to: receive first asynchronous data from an operating system, running on a central processing unit of the first device, on an operating system signal path; transmit the first asynchronous data from the first device to the second device on a command signal path; transmit data from the transmit buffer to the second device at a first fixed packet frequency on a transmit signal path; and receive data from the second device at a second fixed packet frequency on a receive signal path different from the transmit signal path.

Example 2 may include the subject matter of Example 1, and further includes a receive buffer. The one or more processing devices may be further configured to: store the received data in the receive buffer; and transmit the received data from the receive buffer to the operating system of the first device on the operating system signal path.

Example 3 may include the subject matter of any of Examples 1-2, further including a receive buffer and further specifying that the one or more processing devices are configured to: store the received data in the receive buffer; and transmit the received data from the receive buffer to hardware of the first device different from the central processing unit of the first device.

Example 4 may include the subject matter of any of Examples 1-3, and further specifies that the second device is a device handler for placing one or more devices-under-test (DUTs) in electrical contact with the first device.

Example 5 may include the subject matter of Example 4, and further specifies that the second device is a device handler for placing a plurality of devices-under-test (DUTs) in electrical contact with the first device, and wherein the received data includes interleaved packets from each of the plurality of DUTs.

Example 6 may include the subject matter of any of Examples 1-5, and further specifies that the transmit and receive signal paths are part of a control loop for operation of the second device.

Example 7 may include the subject matter of any of Examples 1-6, and further specifies that the transmit buffer is populated with data from the operating system running on the central processing unit of the first device.

Example 8 may include the subject matter of any of Examples 1-7, and further specifies that the transmit buffer is populated with data from a device external to the first device.

Example 9 may include the subject matter of any of Examples 1-8, and further specifies that the command signal path, the transmit signal path or the receive signal path include RS-422 transceivers in accordance with an American National Standards Institute (ANSI) standard.

Example 10 is a method of communicating between first and second devices, including: receiving first asynchronous data from an operating system of the first device, the first asynchronous data including a command; transmitting the first asynchronous data to the second device on a first command signal path; receiving second asynchronous data from the second device on a second command signal path different from the first command signal path, the second asynchronous data including a response to the command; receiving data from the second device on a data signal path different from the first and second command signal paths, the data including packets transmitted at a fixed frequency; and transmitting the data to the operating system of the first device.

Example 11 may include the subject matter of Example 10, and further includes: determining a value of an identification field in a header of a packet of data received from the second device; selecting a buffer based on the determined value; and storing at least a portion of the packet in the selected buffer.

Example 12 may include the subject matter of any of Examples 10-11, and further includes: determining a value of an error field in a header of a packet of data received from the second device; and in response to determining the value of the error field, transmitting a status request to the second device on the first command signal path.

Example 13 may include the subject matter of any of Examples 10-12, and further includes transmitting, to the second device on a first device present signal path different from the first command signal path, an indicator that the first device is not available for communication.

Example 14 may include the subject matter of Example 13, and further includes, in response to the indicator that the first device is not available for communication, disabling the first command signal path, the second command signal path, or the data signal path.

Example 15 may include the subject matter of any of Examples 10-14, and further includes receiving, from the second device on a second device present signal path different from the second command signal path, an indicator that the second device is not available for communication.

Example 16 may include the subject matter of Example 15, and further includes, in response to the indicator that the second device is not available for communication, disabling the first command signal path, the second command signal path, or the data signal path.

Example 17 may include the subject matter of any of Examples 10-16, and further includes transmitting a reset signal to the second device on a reset signal path different from the first command signal path.

Example 18 may include the subject matter of any of Examples 10-17, and further includes receiving fault information from the second device on a fault signal path different from the second command signal path.

Example 19 is an apparatus for communicating with a device handler, including: a central processing unit (CPU); machine-readable media including machine-readable instructions that, when executed by the CPU, cause the apparatus to run an operating system, and run, on the operating system, a program for controlling a device handler; one or more processing devices different from the CPU; and machine-readable media including machine-readable instructions that, when executed by the one or more processing devices, cause the apparatus to receive first asynchronous data from the operating system, the first asynchronous data including a command, transmit the first asynchronous data to the device handler on a first command signal path, receive second asynchronous data from the device handler on a second command signal path different from the first command signal path, the second asynchronous data including a response to the command, transmit data to the device handler on a transmit signal path different from the first and second command signal paths, the transmitted data including packets transmitted at a first fixed frequency, receive data from the device handler on a receive signal path different from the first and second command signal paths and different from the transmit signal path, the received data including packets transmitted at a second fixed packet frequency, and transmit the received data to the operating system.

Example 20 may include the subject matter of Example 19, and further specifies that the first fixed packet frequency and the second fixed packet frequency are a same frequency.

Example 21 may include the subject matter of any of Examples 19-20, further including an external device signal path, and further specifying that the machine-readable media further include machine-readable instructions that, when executed by the one or more processing devices, cause the apparatus to receive data from an external device, and store the data received from the external device in a transmit buffer for transmission to the device handler on the transmit signal path.

Example 22 may include the subject matter of any of Examples 19-21, and further specifies that the transmitted data includes temperature or pressure data for a device under test handled by the device handler.

Example 23 may include the subject matter of any of Examples 19-22, and further specifies that the transmit signal path and the receive signal paths are part of a control loop for thermal control of a device-under-test handled by the device handler.

Example 24 is machine readable media having machine-readable instructions that, when executed by one or more processing devices of an apparatus, cause the one or more processing devices to perform the method of any of Examples 10-18.

Example 25 is an apparatus including means for performing the method of any of Examples 10-18.

The above description of illustrated implementations, including what is described in the Abstract, is not intended to be exhaustive or to limit the disclosure to the precise forms disclosed. While specific implementations are described herein for illustrative purposes, various equivalent modifications are possible within the scope of the disclosure, as those skilled in the relevant art will recognize.

These modifications may be made to the disclosed embodiments in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

What is claimed is:

1. A bus for communication between first and second devices, comprising:
    a transmit buffer; and
    one or more processing devices configured to:
        receive first asynchronous data from an operating system, running on a central processing unit of the first device, on an operating system signal path;
        transmit the first asynchronous data from the first device to the second device on a command signal path;
        transmit data from the transmit buffer to the second device at a first fixed packet frequency on a transmit signal path;
        receive data from the second device at a second fixed packet frequency on a receive signal path different from the transmit signal path; and
        transmit a reset signal to the second device on a reset signal path different from the command signal path.

2. The bus of claim 1, further comprising:
    a receive buffer;
    wherein the one or more processing devices are further configured to:
        store the received data in the receive buffer; and
        transmit the received data from the receive buffer to the operating system of the first device on the operating system signal path.

3. The bus of claim 1, further comprising:
    a receive buffer;
    wherein the one or more processing devices are further configured to:
        store the received data in the receive buffer; and
        transmit the received data from the receive buffer to hardware of the first device different from the central processing unit of the first device.

4. The bus of claim 1, wherein the second device is a device handler for placing one or more devices-under-test (DUTs) in electrical contact with the first device.

5. The bus of claim 4, wherein the second device is a device handler for placing a plurality of devices-under-test (DUTs) in electrical contact with the first device, and wherein the received data comprises interleaved packets from each of the plurality of DUTs.

6. The bus of claim 1, wherein the transmit and receive signal paths are part of a control loop for operation of the second device.

7. The bus of claim 1, wherein the transmit buffer is populated with data from the operating system running on the central processing unit of the first device.

8. The bus of claim 1, wherein the transmit buffer is populated with data from a device external to the first device.

9. The bus of claim 1, wherein the command signal path, the transmit signal path or the receive signal path comprise RS-422 transceivers in accordance with an American National Standards Institute (ANSI) standard.

10. A method of communicating between first and second devices, comprising:
receiving first asynchronous data from an operating system of the first device, the first asynchronous data comprising a command;
transmitting the first asynchronous data to the second device on a first command signal path;
receiving second asynchronous data from the second device on a second command signal path different from the first command signal path, the second asynchronous data comprising a response to the command;
receiving data from the second device on a data signal path different from the first and second command signal paths, the data comprising packets transmitted at a fixed frequency;
transmitting the data to the operating system of the first device; and
receiving fault information from the second device on a fault signal path different from the second command signal path.

11. The method of claim 10, further comprising:
determining a value of an identification field in a header of a packet of data received from the second device;
selecting a buffer based on the determined value; and
storing at least a portion of the packet in the selected buffer.

12. The method of claim 10, further comprising:
determining a value of an error field in a header of a packet of data received from the second device; and
in response to determining the value of the error field, transmitting a status request to the second device on the first command signal path.

13. The method of claim 10, further comprising:
transmitting, to the second device on a first device present signal path different from the first command signal path, an indicator that the first device is not available for communication.

14. The method of claim 10, further comprising:
receiving, from the second device on a second device present signal path different from the second command signal path, an indicator that the second device is not available for communication.

15. The method of claim 10, further comprising:
transmitting a reset signal to the second device on a reset signal path different from the first command signal path.

16. The method of claim 13, further comprising:
in response to the indicator that the first device is not available for communication, disabling the first command signal path, the second command signal path, or the data signal path.

17. The method of claim 14, further comprising:
in response to the indicator that the second device is not available for communication, disabling the first command signal path, the second command signal path, or the data signal path.

18. An apparatus for communicating with a device handler, comprising:
a central processing unit (CPU);
machine-readable media comprising machine-readable instructions that, when executed by the CPU, cause the apparatus to:
run an operating system, and
run, on the operating system, a program for controlling a device handler;
one or more processing devices different from the CPU; and
machine-readable media comprising machine-readable instructions that, when executed by the one or more processing devices, cause the apparatus to:
receive first asynchronous data from the operating system, the first asynchronous data comprising a command,
transmit the first asynchronous data to the device handler on a first command signal path,
receive second asynchronous data from the device handler on a second command signal path different from the first command signal path, the second asynchronous data comprising a response to the command,
transmit data to the device handler on a transmit signal path different from the first and second command signal paths, the transmitted data comprising packets transmitted at a first fixed frequency,
receive data from the device handler on a receive signal path different from the first and second command signal paths and different from the transmit signal path, the received data comprising packets transmitted at a second fixed packet frequency, and
transmit the received data to the operating system.

19. The apparatus of claim 18, wherein the first fixed packet frequency and the second fixed packet frequency are a same frequency.

20. The apparatus of claim 18, further comprising:
an external device signal path;
wherein the machine-readable media further comprise machine-readable instructions that, when executed by the one or more processing devices, cause the apparatus to:
receive data from an external device; and
store the data received from the external device in a transmit buffer for transmission to the device handler on the transmit signal path.

21. The apparatus of claim 18, wherein the transmitted data comprises temperature or pressure data for a device under test handled by the device handler.

22. The apparatus of claim 18, wherein the transmit signal path and the receive signal paths are part of a control loop for thermal control of a device-under-test handled by the device handler.

* * * * *